United States Patent
Ambs et al.

[11] Patent Number: 5,875,644
[45] Date of Patent: Mar. 2, 1999

[54] HEAT EXCHANGER AND HEAT PUMP CIRCUIT

[75] Inventors: Rex K. Ambs; Thomas G. Kiessel, both of Traverse City, Mich.

[73] Assignee: Geofurnace Systems, Inc., Traverse City, Mich.

[21] Appl. No.: 905,192

[22] Filed: Aug. 4, 1997

Related U.S. Application Data

[62] Division of Ser. No. 491,239, Jun. 16, 1995, Pat. No. 5,706,888.

[51] Int. Cl.$^6$ ...................................................... F25B 13/00
[52] U.S. Cl. ...................... 62/324.6; 62/260; 62/DIG. 17
[58] Field of Search ........................... 62/DIG. 17, 324.1, 62/324.6, 260; 165/95, 45

[56] References Cited

U.S. PATENT DOCUMENTS

| | | |
|---|---|---|
| 1,554,654 | 9/1925 | Prisner ..................... 165/155 |
| 1,597,618 | 8/1926 | Prisner ..................... 165/155 |
| 3,882,937 | 5/1975 | Robinson . |
| 4,171,721 | 10/1979 | Movick . |
| 4,173,865 | 11/1979 | Sawyer ..................... 62/324.6 |
| 4,212,156 | 7/1980 | Nagase . |
| 4,255,936 | 3/1981 | Cochran . |
| 4,286,651 | 9/1981 | Steiger et al. . |
| 4,325,228 | 4/1982 | Wolf . |
| 4,671,351 | 6/1987 | Rappe . |
| 4,714,108 | 12/1987 | Barry . |
| 4,716,741 | 1/1988 | Bednarek ..................... 62/DIG. 17 |

FOREIGN PATENT DOCUMENTS

| | | |
|---|---|---|
| 2911425 | 9/1980 | Germany . |
| 3015149 | 10/1981 | Germany . |
| 3022588 | 12/1981 | Germany . |
| 3142347 | 5/1983 | Germany . |
| 3203526 | 8/1983 | Germany . |
| 57-187557 | 11/1982 | Japan . |

*Primary Examiner*—John M. Sollecito
*Attorney, Agent, or Firm*—Warner Norcross & Jud

[57] ABSTRACT

A heat exchanger and heat pump circuit having an operating subcircuit and a pump down subcircuit each including a liquid line and a heat transfer tube. The heat transfer tube of the pump down subcircuit surrounds the liquid line of the operating subcircuit. During the heating cycle, the heat pump circuit circulates refrigerant through both subcircuits to abstract heat from the heat source/sink. However, during the cooling cycle, the heat pump circuit circulates refrigerant only through the operating subcircuit. Also during the cooling cycle, the heat pump circuit places the pump down subcircuit at low pressure to thermally insulate the operating subcircuit liquid line.

14 Claims, 5 Drawing Sheets

HEAT EXCHANGER AND HEAT PUMP CIRCUIT

This is a divisional of application Ser. No. 08/491,239, filed Jun. 16, 1995 (now U.S. Pat. No. 5,706,888).

BACKGROUND OF THE INVENTION

The present invention relates to heat pumps, and more particularly to a heat exchanger and a heat pump circuit for a direct expansion heat pump.

Heat pumps have long been used as year-round air conditioning systems that operate in a heating cycle and a cooling cycle. Heat pumps are generally more efficient than conventional heating and cooling systems because they transfer rather than create heat. The fundamental principles of heat pump operation are simple. In the heating cycle, the heat pump draws heat from an outside heat source such as earth, air, or water and transfers it to the conditioned space. In the cooling cycle, the heat pump abstracts heat from the conditioned space and dissipates it into an outside heat sink.

In a conventional heat pump circuit, refrigerant is pumped through an outdoor coil where ambient air either heats or cools the refrigerant. The heated or cooled refrigerant is pumped through an indoor coil to heat or cool the conditioned space. Experience has revealed that this type of heat pump is relatively inefficient, largely because ambient air does not function as a stable heat source/sink. A number of "heat exchangers" have been developed to increase the efficiency of heat pumps by utilizing the earth or outside water as the heat source/sink. Heat exchangers replace the conventional outdoor coil and can be buried in the ground or submerged in a well, lake or river to facilitate heat transfer between the refrigerant and the heat source/sink.

Heat exchangers are available in a variety of designs. Among the most popular designs are "U" shaped and coaxial heat exchangers. A typical "U" shaped design includes a liquid line and a vapor line that are connected to form opposite legs of a "U". In a conventional coaxial design, the liquid line extends coaxially into the center of a heat transfer tube. The end of the liquid line is open to allow refrigerant to flow between the line and tube. In the heating cycle, liquid refrigerant flows into the liquid line where it receives heat from the heat source. The refrigerant evaporates and flows out of the heat exchanger through the vapor line or heat transfer tube. The vaporized refrigerant flows through an indoor coil where it condenses. The heat released in the coil during the phase change is passed into the conditioned space. The liquified refrigerant then flows back into the heat exchanger to repeat the cycle. In the cooling cycle, vaporized refrigerant enters the vapor line or heat transfer tube where it condenses to transfer heat to the heat sink. The liquid refrigerant passes through the liquid line into an indoor coil where the liquid refrigerant evaporates by abstracting heat from the conditioned space. The vaporized refrigerant then flows back into the heat exchanger to repeat the cycle.

It is well known that there is a refrigerant imbalance between the cooling and heating cycles. During the cooling cycle, liquid refrigerant must fill the entire liquid line before it returns to the circuit for use. Consequently, a tremendous amount of liquid refrigerant is needed during the cooling cycle. However, the heating cycle does not require such a large volume of refrigerant because the vaporized refrigerant expands quickly and rises, returning to the circuit for use. To overcome the imbalance, some manufacturers provide the system with a refrigerant receiver that stores the refrigerant during the heating cycle when it is not needed. Refrigerant receivers increase the size and cost of the system. Alternatively, some systems include multiple heat exchangers some of which are shut down during the cooling cycle. The refrigerant passing through the shut-down exchangers during the heating cycle is thereby made available for use by the remaining exchangers during the cooling cycle. This type of system is relatively expensive to manufacture and install. And finally, some systems include a control system that drains refrigerant from the system during heating and return it to the system during cooling. Again, the control system increases the size and cost of the heat pump system.

During the cooling cycle, a significant amount of heat dissipates from the vapor line as the refrigerant condenses. Some of this heat is transferred to the liquid line where it heats the liquid refrigerant causing it to vaporize or "flash off". This reduces the efficiency of the system. To overcome this problem, a variety of methods for thermally insulating the liquid line from the vapor line have been developed. One simple method is to increase the distance between the vapor line and the liquid line. A second method is to wrap the liquid line with insulation. A third method is to separate the vapor line and liquid line by a vacuum. All of these methods increase the manufacturing and installation costs of the system.

In addition, in northern climates there is disparity in the amount of heat exchange area needed during the heating cycle and the cooling cycle. Some manufacturers have addressed this problem by providing the system with multiple heat exchangers. During the cooling cycle, some of the heat exchangers are shut-down to provide the appropriate heat exchange area.

SUMMARY OF THE INVENTION

The aforementioned problems are overcome by the present invention which provides a heat exchanger having a pump down subcircuit and an operating subcircuit. Both subcircuits include a liquid line serially connected with a heat transfer tube. The liquid line of the operating subcircuit extends through the heat I transfer tube of the pump down subcircuit. During the heating cycle, both subcircuits operate to provide maximum heat transfer between the heat source/sink and the refrigerant. During the cooling cycle, however, the pump down subcircuit is not used to transfer heat. Instead, the liquid refrigerant is drawn from the subcircuit to leave a low density gas surrounding the liquid line of the operating circuit.

In a preferred embodiment, the heat exchanger includes a continuous U-shaped outer tube that is divided into two heat transfer tubes by a bypass seal fit within the tube. Separate liquid lines extend coaxially into each heat transfer tube and connect to the bypass seal. The bypass seal interconnects each liquid line with the heat transfer tube surrounding the other liquid line to create an operating subcircuit interwoven with a pump down subcircuit. The pump down subcircuit connects to a portion of the heat pump circuit that contains low pressure during the cooling cycle. As a result, the circuit draws liquid refrigerant from the pump down subcircuit during the cooling cycle. Consequently, during the cooling cycle, the pump down subcircuit contains a low density gas that insulates the liquid line from the heat dissipating from the vapor line. Further, the refrigerant circulating through the pump down subcircuit during the heating cycle is available for use by the operating subcircuit during the cooling cycle.

The present invention provides a simple and effective heat exchanger and heat pump circuit that balances the refrigerant requirements between the heating and cooling cycles. In addition, the present invention effectively insulates the liquid line of the operating subcircuit from the heat dissipated by the condensing vapor during the cooling cycle. Further, the outer tube can be continuous so that no joints are located within the heat source/sink. This increases the reliability of the system and facilitates a double wall construction.

These and other objects, advantages, and features of the invention will be more readily understood and appreciated by reference to the detailed description of the preferred embodiment and the drawings.

DETAILED DESCRIPTION OF THE PREFERRED EMBODIMENT

Figure 1:
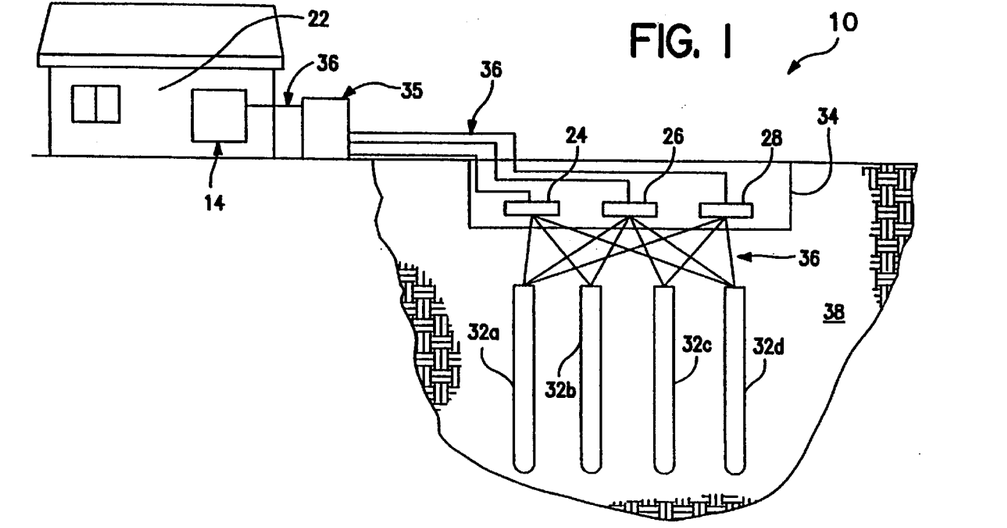
FIG. 1 is an illustrative diagram of a heat pump system according to a preferred embodiment of the present invention.
Figure 2:
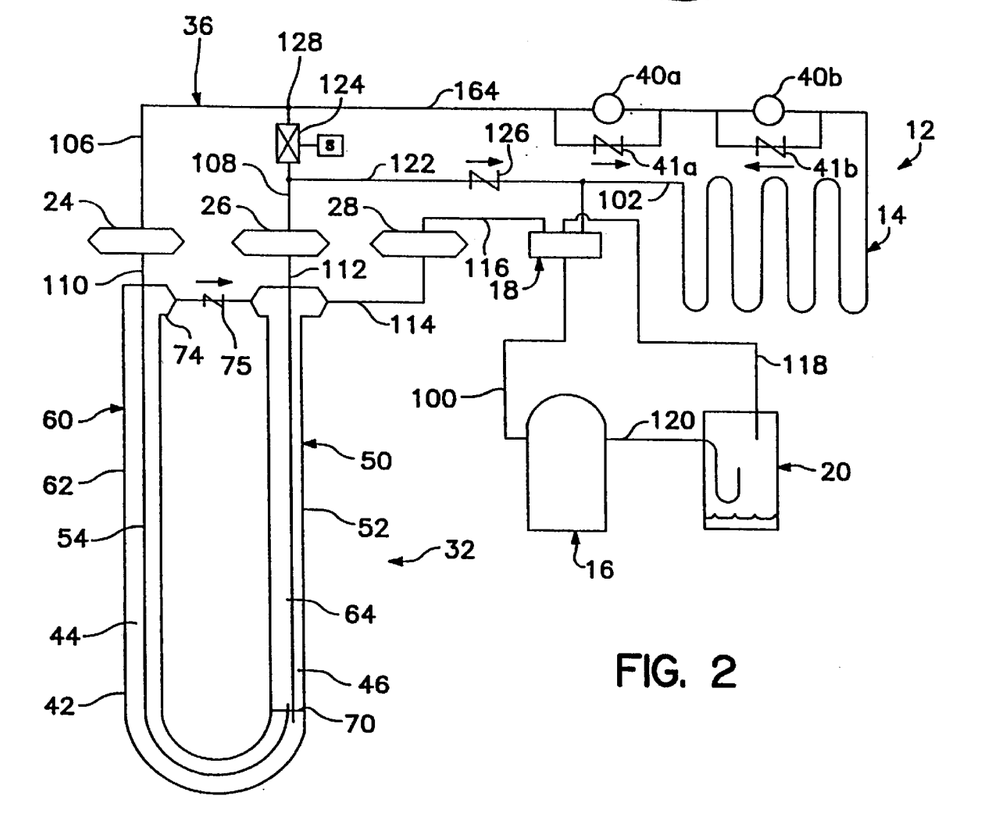
FIG. 2 is a schematic diagram of the heat pump circuit.

A heat pump system constructed in accordance with a preferred embodiment of the present invention is illustrated in FIGS. 1 and 2, and generally designated 10. The heat pump system 10 operates to either cool or heat a space 22 by transferring heat to and from an outside heat source/sink, such as the earth 38. The system 10 includes a generally conventional heat pump circuit 12 having an air handler coil 14, a compressor 16, a reversing valve 18, an accumulator 20, a number of manifolds 24, 26, and 28, a number of heat exchangers 32a-d, and a network of conventional refrigerant lines 36 interconnecting the various components. Except as described below, the operation and interrelationship of these components is generally well known to those skilled in the art. Accordingly, the individual components will not be discussed in detail. However, a general summary of the function of each of. these components will be provided.

The compressor 16 pumps a refrigerant through the heat pump circuit 12. As the refrigerant circulates, it abstracts, releases, and caries heat throughout the circuit. In the cooling cycle, the refrigerant abstracts heat from the conditioned space 22 and dissipates it into the earth 38. In the heating cycle, the refrigerant abstracts heat from the earth 38 and releases it into the conditioned space 22. In a preferred embodiment, compressor 16, reversing valve 18, and accumulator 20 are contained in a cabinet 35 located outside of space 22. However, the location of these components is not important. For example, any of these components can be located within space 22, and in many applications the compressor and air handler coil can be an integral unit.

The air handler coil 14 is located in the conditioned space 22 to transfer heat between the refrigerant and the conditioned space 22. In the heating cycle, the air handler coil functions as a condenser where vaporized refrigerant is cooled and changed into a liquid. During the phase change, the refrigerant releases a significant amount of heat into the space 22. In the cooling cycle, the air handler coil functions as an evaporator where liquid refrigerant is heated and changed into a vapor. During the phase change, the refrigerant abstracts a significant amount of heat from the space 22.

The heat exchangers 32a–d are typically buried in the earth 38 or submerged in an outside water source such as a well, river, stream, or lake. The heat exchangers 32a–d transfer heat between the refrigerant and the heat source/sink, in this case the earth 38. In the heating cycle, the heat exchangers function as an evaporator where liquid refrigerant is heated and changed into a vapor. During the phase change, a significant amount of heat is abstracted from the earth 38. In the cooling cycle, the heat exchangers function as a condenser where vaporized refrigerant is cooled and changed into a liquid. During the phase change, a significant amount of heat is dissipated into the earth 38.

The reversing valve 18 switches the system 10 between the heating and cooling cycles. During the heating cycle, the reversing valve 18 directs the refrigerant from the compressor 16 to the air handler coil 14. From the air handler coil 14, the refrigerant flows to the heat exchangers 32a–d through manifolds 24 and 26. The refrigerant then flows from the heat exchangers to the reversing valve through manifold 28. The reversing valve 18 directs the returning refrigerant through the accumulator 20 and back to the compressor 16. During the cooling cycle the flow is essentially reversed. The refrigerant from the compressor 16 is directed to the heat exchangers 32a–d via manifold 28. The refrigerant flows from the heat exchangers 32a–d to the air handler coil 14 through manifold 24. From the air handler coil 14, the refrigerant returns to the reversing valve 18 which directs it to the accumulator 20 and back to the compressor 16.

Accumulator 20 prevents liquid refrigerant from flowing into and possibly damaging the compressor. As refrigerant enters accumulator 20, the liquid refrigerant falls into the reservoir where it is stored while the vaporized refrigerant is free to exit the accumulator and flow to compressor 16.

In certain applications, it may be necessary to add a receiver (not shown) or other conventional component for storing excess refrigerant during the heating or cooling cycle.

The manifolds 24, 26, and 28 are typically housed in a pit 34 located adjacent to the heat exchangers 32a–d. The manifolds 24, 26, and 28 allow the desired number of heat exchangers 32a–d to be connected in parallel to the heat pump system 10.

The refrigerant line network is generally conventional except for the pump down circuitry described below. Suffice it to say that the network is comprised of copper tubing or other suitable materials that interconnect the various circuit components in a conventional manner. The network includes line 100 interconnecting compressor 16 and reversing valve 18, line 102 interconnecting reversing valve 18 and air handler coil 14, line 104 interconnecting air handler coil 14 and splitter 128 (described below), lines 106 and 108 interconnecting splitter 128 with manifolds 24 and 26, lines 110 and 112 interconnecting manifolds 24 and 26 with heat exchanger 32, line 114 interconnecting heat exchanger 32 and manifold 28, line 116 interconnecting manifold 28 and reversing valve 18, line 118 interconnecting reversing valve 18 and accumulator 20, line 120 interconnecting accumulator 20 and compressor 16, and line 122 interconnecting line 108 and line 102.

A pair of thermostatic expansion valves 40a–b are placed along line 104 to meter the flow of refrigerant. The expansion valves 40a–b are connected in parallel with a pair of one-way check valves 41a–b. The check valves 41a–b direct refrigerant through expansion valve 40a during the heating cycle and expansion valve 40b during the cooling cycle. Alternatively, the expansion valves can be replaced by suitable fixed orifice metering devices, capillary tubes or the like. The type and size of the metering device will be selected to provide the appropriate refrigerant flow rate.

Additionally, a solenoid-operated valve 124 is placed along line 108 to allow selective control over the flow of refrigerant through line 108. Operation of valve 124 is controlled by a conventional control system (not shown). A one-way check valve 126 is placed along line 122 to prevent the flow of refrigerant from line 102 to line 108.

Splitter 128 divides the flow of refrigerant between the operating subcircuit and the pump down subcircuit during the heating cycle. Liquid refrigerant flows into splitter 128 from line 104 and out of splitter 128 through lines 106 and 108. In a preferred embodiment, splitter 128 is a conventional "T" joint.

Figure 5:
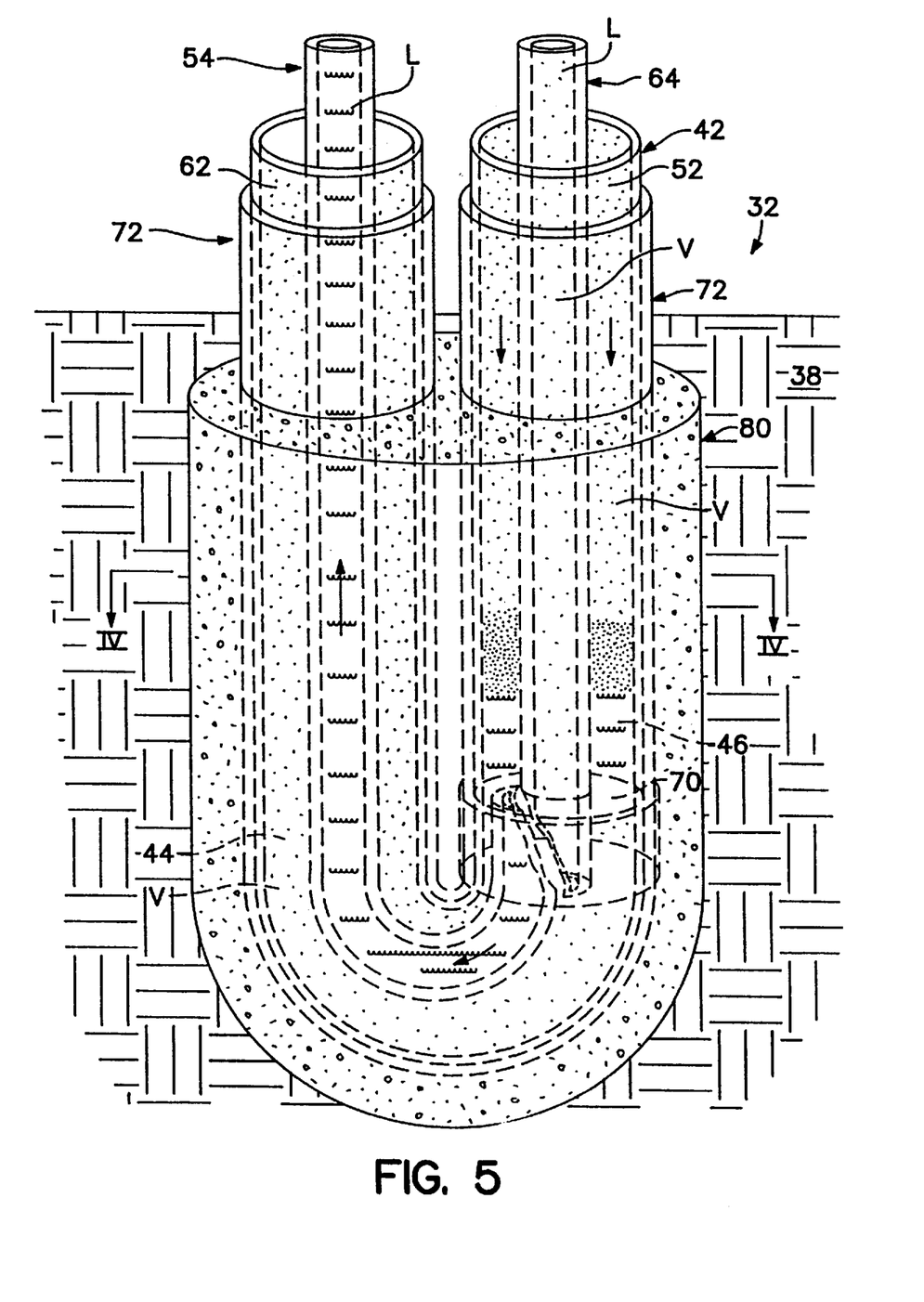
FIG. 5 is a perspective view of the heat exchanger showing operation in the cooling cycle.

The heat exchangers 32a–d are generally identical and, as noted above, are buried or submerged in a heat source/sink such as the earth, a well, a lake, a pond, or a stream. The heat exchangers 32a–d are connected in parallel to the circuit through manifolds 24, 26, and 28. The number of heat exchangers 32a–d will vary from application to application depending on the desired amount of heat transfer. Each heat exchanger 32a–d includes an operating subcircuit 50 and a pump down subcircuit 60 (see FIGS. 2, 3, and 5). Each subcircuit includes a heat transfer tube 52, 62, connected in series with a liquid line 54, 64. The heat transfer tube 62 of the pump down subcircuit 60 surrounds the liquid line 54 of the operating subcircuit 50.

Figure 3:
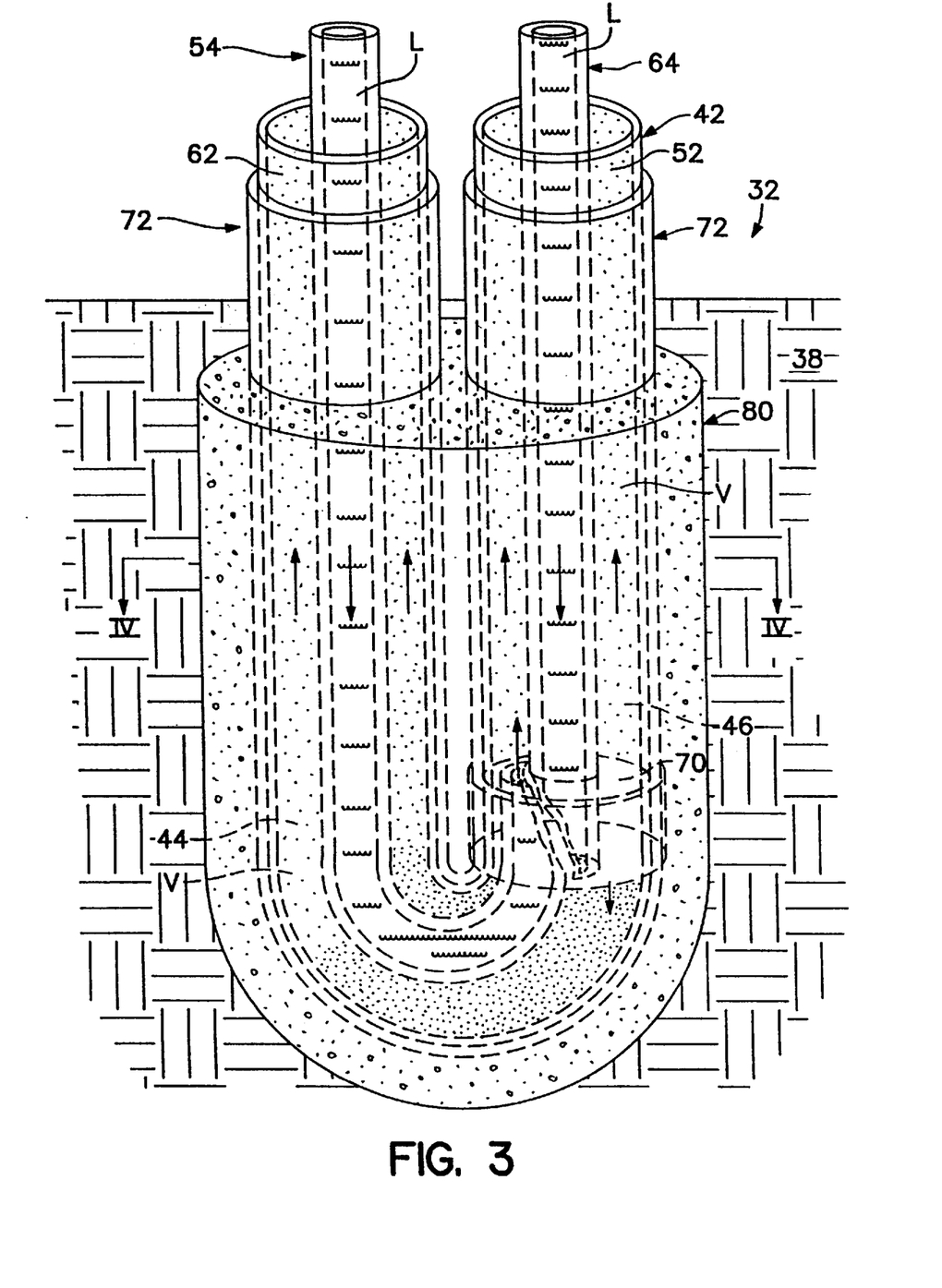
FIG. 3 is a perspective view of the heat exchanger showing operation in the heating cycle.

In a preferred embodiment, the heat exchanger 32 includes a continuous, substantially U-shaped outer tube 42 that is divided into two discrete segments 44 and 46 by a bypass seal 70. The two segments 44 and 46 function as heat transfer tubes 52 and 62. obviously, the continuous outer tube 42 can be replaced by a jointed outer tube assembly. The liquid lines 54 and 64 are of substantially smaller diameter than the outer tube 42, and extend substantially coaxially into opposite ends of the outer tube 42. Liquid line 54 is connected to manifold 24 via line 110 and liquid line 64 is connected to manifold 26 via line 112 (see FIG. 2). The bypass seal 70 interconnects each liquid line 54 and 64 with the corresponding heat transfer tube 52 and 62, respectively. The outer tube and liquid lines are preferably conventional copper tubing, however, a wide variety of conventional materials will suffice. The two heat transfer tubes 52 and 62 are interconnected by a vapor line 74 having a one-way check valve 75 that permits refrigerant to flow only from heat transfer tube 62 to heat transfer tube 52 (see FIG. 2). The two heat transfer tubes 52 and 62 are connected to manifold 28 via line 114. Alternatively, vapor line 74 and check valve 75 can be eliminated and an additional manifold (not shown) can be installed in communication with heat transfer tube 62. In this alternative, a new vapor line and check valve would extend between the new manifold (not shown) and manifold 28 to join the refrigerant from heat transfer tubes 52 and 62.

During use, it is possible for the outer wall 42 to fail allowing refrigerant to leak into the environment. To protect the environment from refrigerant leaks and to provide a method for identifying these leaks, the heat exchanger 32 preferably includes a double-wall construction that allows the heat exchanger to vent to the atmosphere. The outer tube 42 is surrounded by a continuous secondary tube 72 that vents above-ground. In a preferred embodiment, the secondary tube 72 is a polyethylene sheath fitted snugly around the outer tube 42. The open ends of the secondary tube 72 remain above-ground so that refrigerant leaking from the outer tube 42 vents above-ground. The system 10 can be provided with conventional apparatus (not shown) for sensing the flow of refrigerant from the secondary tube 72.

The heat exchanger 32 is preferably grouted to improve heat transfer with the earth 38. Grout 80 is well known to those skilled in the art and consequently will not be discussed in detail. Suffice it to say that volcanic clay or concrete grout is preferred.

Figure 4:
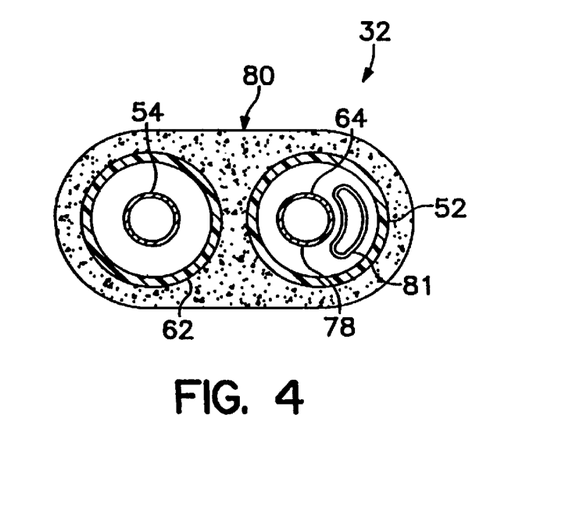
FIG. 4 is a top sectional view of the heat exchanger taken along line IV—IV of FIG. 3.
Figure 6:
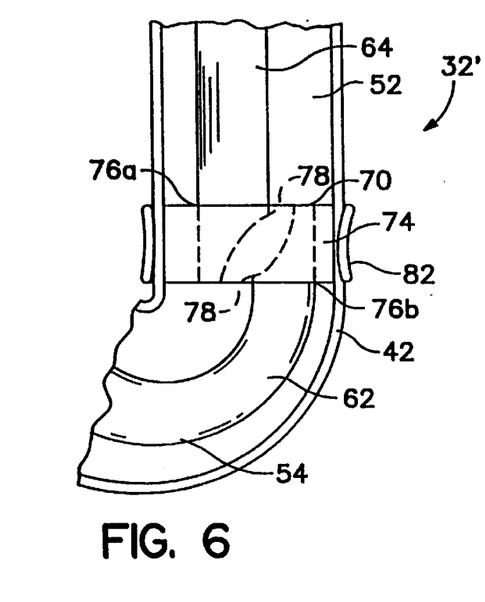
FIG. 6 is a partially sectional view of the heat exchanger and the bypass seal.
Figure 7:
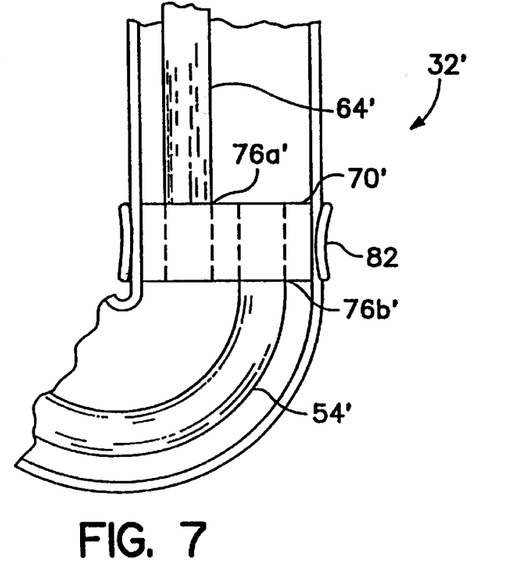
FIG. 7 is a partially sectional view of the heat exchanger and an alternative bypass seal.

As noted above, the bypass seal 70 is fitted within the outer tube 42 to divide the outer tube 42 into segments 44 and 46. The location of the bypass seal 70 can vary depending on the specific design of the heat pump circuit 12 and the heat exchanger 32. For example, the bypass seal 70 can be moved to compensate for refrigerant imbalance between the cooling and heating cycles. In addition, the bypass seal 70 can be located on the opposite side of the "U" or at the bottom of the "U" to facilitate the return of oil to the compressor. As perhaps best illustrated in FIG. 6, the bypass seal 70 includes a plug 74 and a pair of bypass openings 76a–b extending through the plug. The bypass seal 70 is preferably manufactured from brass or copper, however, a variety of materials will suffice including a wide range of elastomers. Each bypass opening $76a \geqq b$ includes a circular end 78 and a half-moon end 81 (See FIG. 4). The liquid lines 54 and 64 enter opposite sides of the bypass seal 70 through circular ends 78. The lines 54 and 64 are brazed, soldered, compression fit, or otherwise secured to the bypass seal 70. Alternatively, if the liquid lines 54' and 64' are of sufficiently small diameter, the bypass openings can be a pair of through bores 76a–b'(See FIG. 7). In a preferred embodiment, a crimp ring 82 is crimped around the outside of the outer tube 42 to secure the bypass seal 70 in place. As a first alternative, the bypass seal 70 can be secured in place by induction brazing or soldering. As a second alternative, the bypass seal can be held in place by the liquid lines and an O-ring that also provides a seal between the plug and the outer tube 42. A variety of other conventional methods can be used to secure the bypass seal 70 in place.

Operation

The heat pump system 10 operates in either a heating cycle or a cooling cycle. During the heating cycle, solenoid valve 124 is open and reversing valve 18 is actuated to interconnect line 100 with line 102 and line 116 with line 118. Compressor 16 pumps vaporized refrigerant through line 100 to reversing valve 18. The refrigerant passes from the reversing valve to the air handler coil 14 through line 102. In the air handler coil, the vaporized refrigerant condenses into a high pressure liquid thereby releasing heat energy into space 22. The liquid refrigerant flows from the air handler coil to the liquid line splitter 128 through line 104. As the refrigerant moves through line 104 it passes through check valve 41b and expansion valve 40a. Expansion valve 40a meters the refrigerant to separate the high pressure side of the circuit from the low pressure side of the circuit. The refrigerant then flows through lines 106 and 108 into manifolds 24 and 26. Check valve 126 prevents refrigerant from flowing through line 102 into line 122. The refrigerant flows from manifolds 24 and 26 to the heat exchanger 32 through lines 110 and 112. If more than one heat exchanger is installed, the manifolds divide the refrigerant to flow in parallel through all of the heat exchangers. The low pressure liquid L flows into the liquid line 54 and 64 of both subcircuits 50 and 60. The liquid refrigerant L flows from the liquid lines 54 and 64 into the heat transfer tubes 52 and 62 where the refrigerant vaporizes thereby abstracting heat from the earth 38 (See FIG. 3). The vaporized refrigerant V flows from heat transfer tube 62 through vapor line 74 and check valve 75 where it unites with the vaporized refrigerant from heat transfer tube 52. The vaporized refrigerant flows to manifold 28 via line 114. If more than one heat exchanger is installed, the vaporized refrigerant from all of the heat exchangers will return to manifold 28. From manifold 28, the refrigerant flows to the reversing valve 18 through line 116 and then to the accumulator 20 through line 118. The refrigerant then flows back to the compressor 16 via line 120 to complete the circuit.

During the cooling cycle, solenoid valve 124 is closed and the reversing valve 18 is actuated to interconnect line 100 with line 116 and line 102 with line 118. The compressor 16 pumps vaporized refrigerant through line 100 to reversing valve 18. The reversing valve directs the refrigerant to manifold 28 via line 116. From manifold 28, the vaporized refrigerant V flows through line 114 into heat transfer tube 52. Check valve 75 prevents the refrigerant from entering heat transfer tube 62. The vaporized refrigerant v condenses in heat transfer tube 52 and the resulting liquid L is forced up through liquid line 54 (See FIG. 5). The liquid refrigerant flows to manifold 24 through line 110. From manifold 24, the liquid refrigerant flows to the air handler coil 14 through line 106, liquid line splitter 128, and line 104. Solenoid valve 124 is closed to prevent refrigerant from flowing through line 108. As the refrigerant moves through line 104 it passes through check valve 41a and expansion valve 40b. Expansion valve 40b meters the refrigerant to separate the high pressure side of the circuit from the low pressure side of the circuit. Inside the air handler coil 14, the refrigerant vaporizes thereby abstracting heat from space 22. The vaporized refrigerant then flows from the air handler coil to the reversing valve 18 via line 102. The reversing valve directs the refrigerant to the accumulator 20 through line 118. And finally, the refrigerant flows back to the compressor via line 120. Simultaneously, the pump down subcircuit 60 is "pumped down" to insulate liquid line 54 from the heat dissipated during condensation of the vaporized refrigerant in heat transfer tube 52. The low pressure in line 102 draws refrigerant from the pump down subcircuit via lines 122, 108, and 112, leaving only low density vaporized refrigerant. The refrigerant drawn from the pump down subcircuit can be used by the circuit to overcome the refrigerant imbalance.

As noted above, the double wall construction protects the environment from leaking refrigerant. If at any time the outer tube 42 begins to leak, the escaping refrigerant will be trapped between the outer tube 42 and the secondary tube 72. The trapped refrigerant will flow between the two tubes until it reaches either or both open ends of the secondary tube 72. A leak can be detected by a sensing device or by visual inspection of the receptacle.

First Alternative Embodiment

Figure 8:
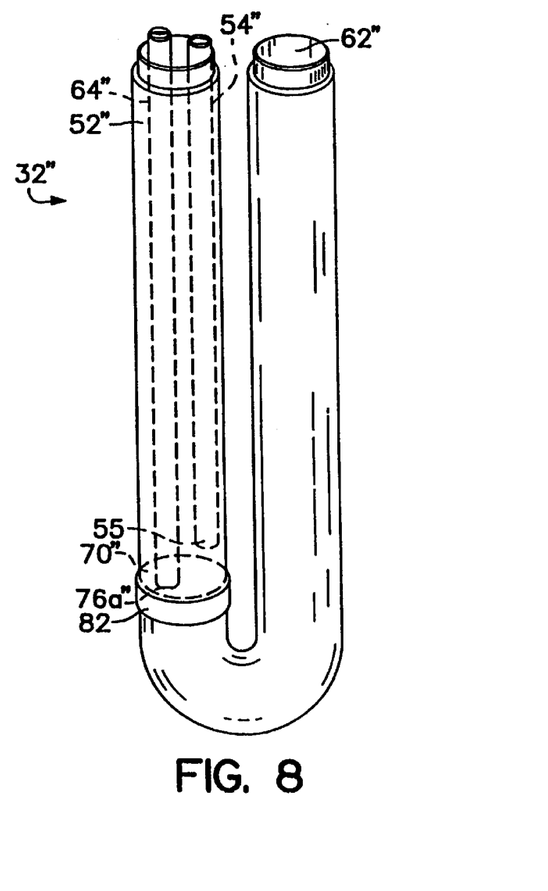
FIG. 8 is a perspective view of an alternative heat exchanger.

In a first alternative embodiment, the heat exchanger is modified to locate both liquid lines in a single heat transfer tube. As illustrated in FIG. 8, liquid line 54 is replaced by liquid line 54". Liquid line 54" includes an open end 55 that communicates with heat transfer tube 52". The bypass seal 70" is modified to include only a single bypass opening 76a" adapted to connect liquid line 64" with heat transfer tube 62". Operation of the alternate heat exchanger 32" is generally identical to that of the preferred embodiment. During the heating cycle, refrigerant circulates through both the pump down and operating subcircuits. However, during the cooling cycle, the pump down subcircuit is pumped down to insulate liquid line 64" from heat dissipated during condensation of refrigerant in heat transfer tube 62".

Second Alternative Embodiment

Figure 9:
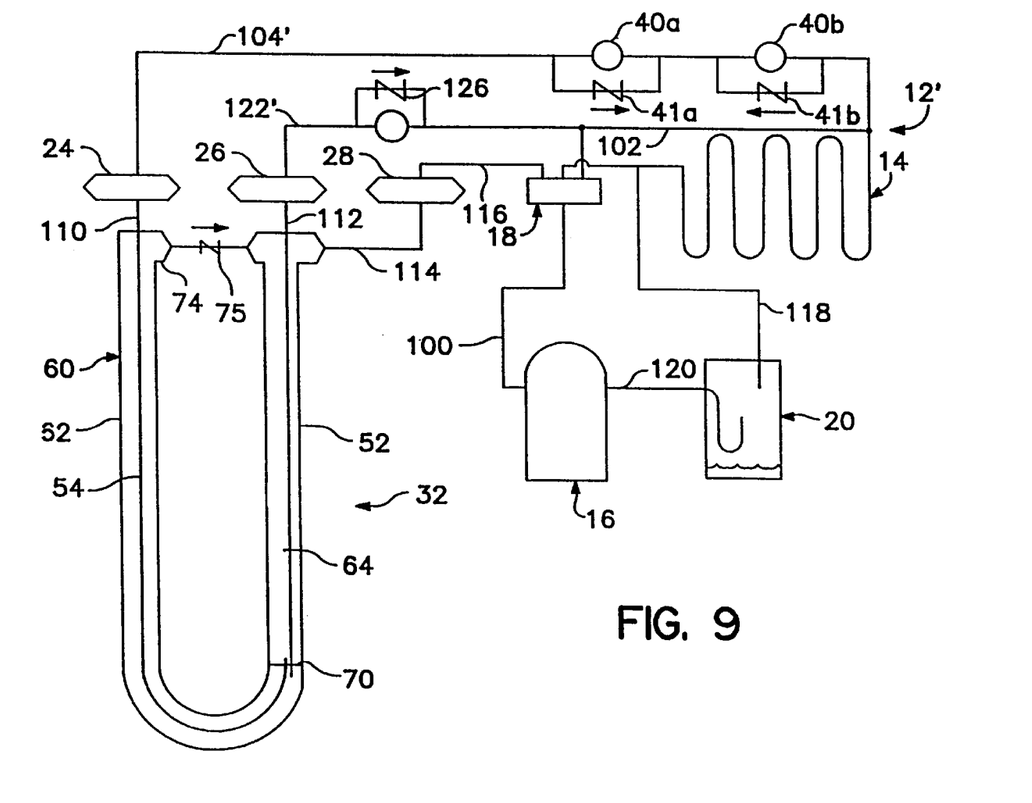
FIG. 9 is a schematic diagram of an alternative heat pump circuit.

A second alternative embodiment is shown in FIG. 9. In this embodiment, the heat pump circuit 12' is modified to return the liquid refrigerant drawn from the pump down subcircuit 60 to the circuit upstream from the air handler coil 14. As illustrated, solenoid valve 124, splitter 128, line 106, and line 108 are eliminated. These components are replaced by a single line 104' extending between air handler coil 14 and manifold 24, a single line 122' extending between manifold 26 and line 104' (between expansion valve 40b and air handler coil 14), and expansion valve 130 placed along line 122' in parallel with check valve 126 to separate the high and low pressure sides of the circuit. During the cooling cycle, refrigerant is free to flow out of the pump down subcircuit 60 through check valve 126. During the heating cycle, the flow of refrigerant is reversed and the refrigerant flows into the pump down subcircuit through expansion valve 130.

The present invention is described in conjunction with a space conditioning system. Those skilled in the art will readily appreciate and understand that the present invention is equally well suited for use with water heating systems, heat disposal systems, and other similar heating and/or cooling systems.

The above description is that of a preferred embodiment of the invention. Various alterations and changes can be made without departing from the spirit and broader aspects of the invention as defined in the appended claims, which are to be interpreted in accordance with the principles of patent law including the doctrine of equivalents.

The embodiments of the invention in which an exclusive property or privilege is claimed are defined as follows:

1. A heat pump operable in a heating cycle and a cooling cycle, comprising:
   a heat exchanger having an operating subcircuit and a pump down subcircuit, said operating subcircuit including a liquid line and a heat transfer tube said pump down subcircuit including a liquid line and a heat transfer tube, said heat transfer tube of said pump down circuit surrounding said liquid line of said operating subcircuit; and
   a circuit means for circulating a refrigerant through said operating subcircuit during the heating cycle and the cooling cycle, circulating said refrigerant through said pump down subcircuit only during the heating cycle, and drawing refrigerant from said pump down circuit during the cooling cycle.

2. The heat pump of claim 1 wherein said circuit means includes a line that is maintained at low pressure during said cooling cycle, said pump down circuit interconnected with said line to draw liquid refrigerant from said pump down circuit during said cooling cycle.

3. The heat pump of claim 2 wherein said heat transfer tube of said operating subcircuit and said heat transfer tube of said pump down subcircuit are defined by a single, continuous outer tube.

4. The heat pump of claim 3 further comprising a bypass seal fitted within said outer tube to separate said heat transfer tube of said operating subcircuit from said heat transfer tube of said pump down subcircuit.

5. The heat pump of claim 4 wherein said heat transfer tube of said operating subcircuit surrounds said liquid line of said pump down subcircuit.

6. The heat pump of claim 5 wherein said outer tube is substantially U-shaped and includes a bend; and wherein said bypass seal is located adjacent said bend.

7. The heat pump of claim 6 further comprising a secondary tube surrounding said outer tube.

8. An improved heat pump having a compressor for circulating a refrigerant, a reversing valve for selectively switching the heat pump between a cooling cycle and heating cycle, a line that is at low pressure during the cooling cycle, an air handler coil for transferring heat between the refrigerant and a space, and a heat exchanger for transferring heat between the refrigerant and a heat source/sink, wherein the improvement comprises said heat exchanger, said heat exchanger comprising:

an operating subcircuit circulating the refrigerant during the heating cycle and the cooling cycle; and a pump down subcircuit that circulates the refrigerant only during said heating cycle, said pump down subcircuit surrounding a portion of said operating subcircuit and being pumped down to low pressure during said cooling cycle.

9. The heat pump of claim 8 wherein:

said operating subcircuit includes a liquid line and a heat transfer tube; and said pump down subcircuit includes a liquid line and a heat transfer tube, said heat transfer tube of said pump down circuit surrounding said liquid line of said operating subcircuit.

10. The heat pump of claim 9 wherein said pump down circuit is interconnected with the line to place said pump down circuit at low pressure during said cooling cycle.

11. The heat pump of claim 10 wherein said heat transfer tube of said operating subcircuit and said heat transfer tube of said pump down subcircuit are defined by a single, continuous outer tube.

12. The heat pump of claim 11 further comprising a bypass seal fitted within said outer tube to separate said heat transfer tube of said operating subcircuit from said heat transfer tube of said pump down subcircuit.

13. The heat pump of claim 12 further comprising a secondary tube surrounding said outer tube.

14. A heat pump operable in a heating cycle and a cooling cycle, comprising:

a condensing/evaporating heat transfer tube divided into first and second sections, each of said sections being fed by a separate liquid line;

first circuit means for feeding refrigerant through both of said liquid lines while in the heating cycle; and second circuit means for feeding refrigerant through only one of said liquid lines and removing refrigerant from said section fed by the other of said liquid lines during the cooling cycle.

* * * * *